April 11, 1967          A. C. HUPP          3,313,984

INSTANTANEOUS MULTIPHASE UNDERVOLTAGE SENSING CIRCUIT

Filed Oct. 11, 1963          2 Sheets-Sheet 1

INVENTOR.
ARTHUR C. HUPP
BY James J. Williams
HIS ATTORNEY

3,313,984
INSTANTANEOUS MULTIPHASE UNDERVOLTAGE SENSING CIRCUIT
Arthur C. Hupp, Waynesboro, Va., assignor to General Electric Company, a corporation of New York
Filed Oct. 11, 1963, Ser. No. 315,441
3 Claims. (Cl. 317—33)

The invention relates to an undervoltage sensing circuit, and particularly to such a circuit for sensing the undervoltage of any phase of a multiphase alternating current source.

In multiphase alternating current systems, it may be desirable that the voltage magnitude of each phase be maintained above a predetermined level, or that the voltage magnitudes of all phases be maintained equally above a predetermined level. If the voltage magnitude of any phase falls below a predetermined level, it is desirable to indicate this condition so that steps can be taken to correct the condition or to take other action.

Accordingly, an object of the invention is to provide an improved circuit that senses the undervoltage of any individual phase of a multiphase alternating current source.

Another object of the invention is to provide an improved circuit that senses the undervoltage of all phases of a multiphase alternating current source.

Briefly, these and other objects of the invention are achieved by rectifying the voltage of each phase of the multiphase alternating current source, and supplying these rectified voltages in unfiltered form to a common connection. A source of reference voltage is set at the desired undervoltage sensing level. The reference voltage source is coupled through a current sensing circuit and a sensing rectifier to the common connection. As long as the instantaneous voltage magnitude on the common connection is above the undervoltage sensing level, the sensing rectifier prevents the sensing circuit from providing an indication. However, if the instantaneous voltage magnitude on the common connection falls below the undervoltage sensing level, the sensing rectifier permits the sensing circuit to provide an indication which may be utilized in any way desired.

The invention is particularly pointed out in the claims. The invention may be better understood from the following description given in connection with the accompanying drawing, in which:

Figure 1:
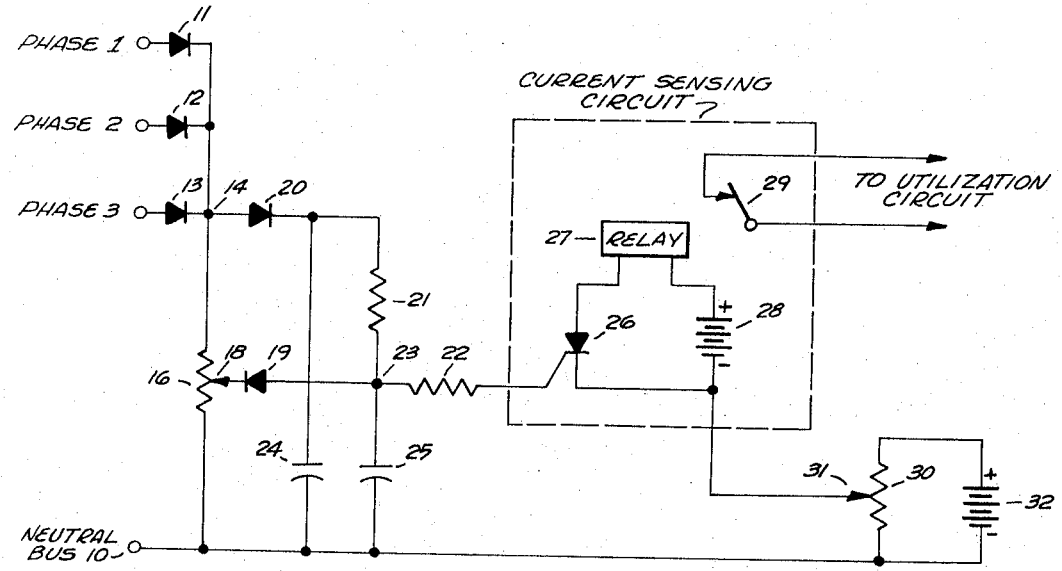
FIGURE 1 shows a schematic diagram of a preferred embodiment of an undervoltage sensing circuit in accordance with the invention.

The embodiment in FIGURE 1 is shown being used with a conventional three-phase 400 cycle alternating current source supplied on phase 1, phase 2, and phase 3 with respect to a neutral bus 10. The phases 1, 2, and 3 are utilized to supply electrical power from some source, not shown, to a load, also not shown. While a three-phase system with a neutral has been shown in FIGURE 1, it is to be understood that the undervoltage sensing circuit of the invention can be used with other multiphase systems either with or without a neutral. A neutral can be provided by suitable transformer windings. Or, no neutral is needed with full wave rectification. Phase rectifiers 11, 12, 13 have their anodes respectively coupled to phases 1, 2, and 3, and have their cathodes coupled together and to a common connection 14. The common connection 14 thus derives or provides a rectified and unfiltered voltage that has an instantaneous magnitude which is indicative of the highest instantaneous voltage magnitude present on the three phases 1, 2, and 3 at any given time. A sensing potentiometer 16 is coupled between the common connection 14 and the neutral bus 10. The sensing potentiometer 16 includes a movable tap 18 which provides an adjustable magnitude of the rectified voltage on the common connection 14. A sensing rectifier 19 has its cathode coupled to the movable tap 18 and its anode coupled to a junction 23. The junction 23 is coupled through a limiting resistor 22 to the gate electrode of a control rectifier 26 which is included in a current sensing circuit shown enclosed in dashed lines. A rectifier 20 has its anode coupled to the common connection 14 and produces a rectified voltage at its cathode which is filtered by a filter capacitor 24. This rectified voltage can also be provided by coupling the rectifier 20 to another source, or can be provided from a direct current source. This voltage is reduced by a resistor 21 coupled between the cathode of the rectifier 20 and the junction 23. A second capacitor 25 is coupled between the junction 23 and the neutral bus 10.

In the current sensing circuit, the anode of the control rectifier 26 is coupled to one side of a winding of a relay 27. The other side of the winding of the relay 27 is coupled to the positive terminal of a source of unidirectional or direct current potential 28. The negative terminal of the source of potential 28 is coupled to the cathode of the control rectifier 26. It will be seen that a series circuit including the source of potential 28, the winding of the relay 27, and the anode-cathode path of the control rectifier 26 is provided. If the control rectifier 26 is a silicon controlled rectifier, the rectifier 26 conducts anode-cathode current when a suitable current flows between its gate electrode and its cathode. When such a current flows, anode-cathode current may flow through the control rectifier 26 to energize the winding of the relay 27 which causes a set of normally open contacts 29 associated with the relay 27 to close. When the anode-cathode current does not flow, the winding of the relay 27 is deenergized, a condition which permits the contacts 29 to open. The opened or closed condition of the contacts 29 can be utilized in any way desired as indicated by the arrows pointing to a utilization circuit.

A reference circuit is provided which includes a suitable source of unidirectional or direct current potential 32 coupled in series with a reference potentiometer 30. The reference potentiometer 30 has a movable tap 31 which provides an adjustable reference voltage on the movable tap 31. The negative terminal of the source of potential 32 is coupled to the neutral bus 10 so that the voltage on the movable tap 31 has a magnitude which is positive with respect to the neutral bus 10. The movable tap 31 is coupled to the cathode of the control rectifier 26 to provide a reference voltage on the cathode of the control rectifier 26.

Figure 2:
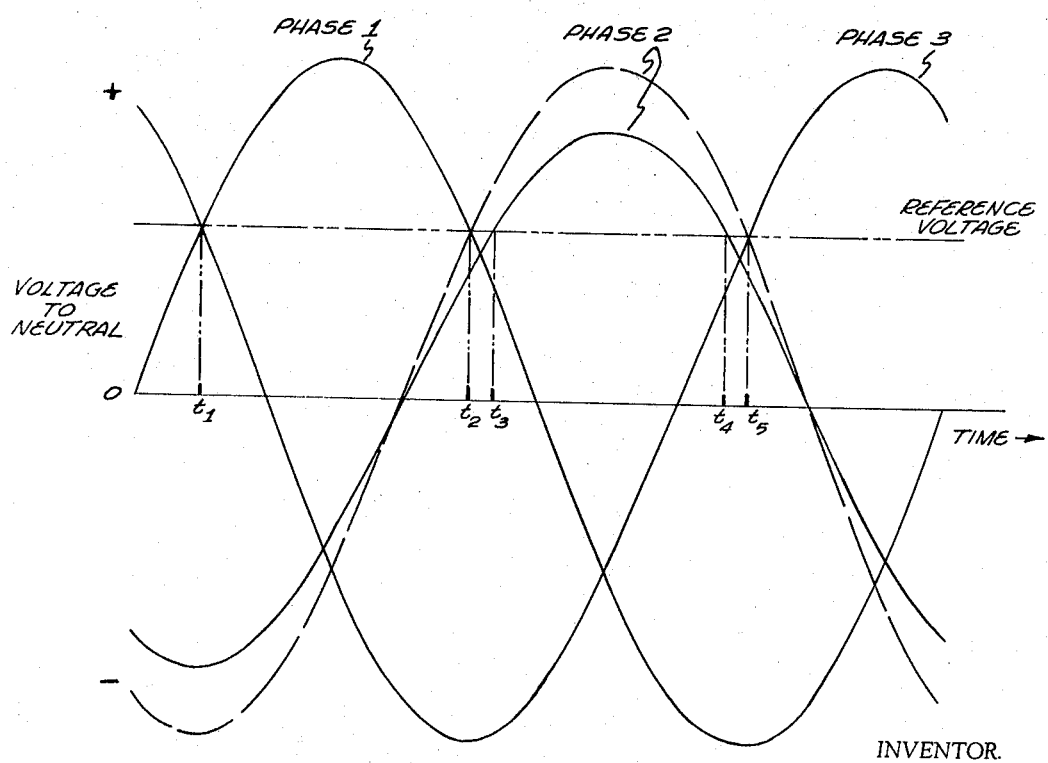
FIGURE 2 shows waveforms for explaining the operation of the sensing circuit of FIGURE 1.

The operation of the circuit shown in FIGURE 1 will be explained in connection with the waveforms shown in FIGURE 2. The waveforms of FIGURE 2 represent the instantaneous voltages to neutral of phase 1, phase 2, and phase 3 as they vary with time. The upper envelope or the greatest instantaneous magnitude of the three waveforms represents the instantaneous voltage to neutral of the common connection 14. In FIGURE 2, is has been assumed that the three phases have sinusoidal voltage which are spaced equally 120 electrical degrees apart. The voltage of phase 2 is shown under two conditions, namely the normal condition shown by the dashed line curve, and a lower or undervoltage condition shown by the solid line curve. The setting for the reference voltage at the cathode of the control rectifier 26 is indicated by the dashed and dotted line which is on the positive side of the zero axis. The movable tap 31 of the reference potentiometer 30 and the movable tap 18 of the sensing potentiometer 16 are set for the normal condition where the voltages of the three phases have magnitude which are equal and at the desired level. The rectifier 20 supplies a current through the resistor 21, through the current limiting resistor 22 to the control electrode of the control rectifier 26, between the control electrode and the cathode, and through the movable tap 31 and the lower part of the reference potentiometer 30 to the neutral bus 10. The current flowing between the control electrode and the cathode of the control rectifier 26 causes anode-cathode current to flow through the control rectifier 26. This current energizes the winding of the relay 27 and the contacts 29 of the relay 27 are closed. This condition exists at all times if the instantaneous voltage of the three phases is above the predetermined level of the reference voltage. And, this condition also exists during the dips between the voltages of adjacent phases, such as the time $t_1$ in FIGURE 2 at which the voltage of phase 3 and the voltage of phase 1 cross at the midpoint (since the sine of 30 degrees and 150 degrees are both 0.5) of their positive excursions. This midpoint has been selected as the level at which the reference voltage is set. If the instantaneous voltage magnitude of one or more phases falls below the level of the reference voltage, then an indication (in the form of open contacts 29) is produced.

An example of an undervoltage condition is shown in FIGURE 2 for phase 2, it being assumed that the voltage magnitude of phase 2 has dropped for some reason as indicated by the solid line curve. Under this condition, the instantaneous voltage magnitude on the common connection 14 and on the movable tap 18 of the sensing potentiometer 16 is lower than normal at certain times, namely the time $t_2$ to $t_3$ and $t_4$ to $t_5$. During these times, the current supplied by the rectifier 20 through the control electrode-cathode path of the control rectifier 26 is diverted and now flows through the sensing rectifier 19, and through the lower part of the sesing potentiometer 16 to the neutral bus 10. With no control electrode-cathode current, the control rectifier 26 stops conducting, the winding of the relay 27 is deenergized, and the contacts 29 are opened. The open contacts 29 thus provide an indication that one or more of the voltage magnitudes of the three phases has fallen below the predetermined reference voltage level. This indication can be utilized in any way desired. The indication of the undervoltage exists between the times $t_2$ and $t_3$. If the capacitor 25 is omitted, the voltage magnitude of phase 2 becomes sufficiently high at the time $t_3$ so that gate electrode-cathode current again flows, the control rectifier 26 conducts, and the winding of the relay 27 is energized. However, the winding of the relay 27 is again deenergized at the time $t_4$ when the voltage magnitude of phase 2 falls below the predetermined reference voltage level. The winding of the relay 27 remains deenergized until the time $t_5$ when the voltage magnitude of phase 3 rises above the predetermined reference voltage level. Actually, the capacitor 25 recharges between the time $t_3$ and the time $t_4$ and between the time $t_5$ and the subsequent time corresponding to the time $t_2$ so that the gate electrode-cathode current is still diverted and the relay winding remains deenergized. This prevents chattering of the relay contacts 29.

By noting that capacitor 25 is permitted to discharge at time $t_2$ to the voltage appearing at the movable arm 18 of potentiometer 16 and is allowed to charge from the period $t_3$ to $t_4$, the time cycle from the period $t_3$ to $t_4$, the time cycle of change and discharge of this capacitor is clear. As soon as the voltage of movable tap 18 falls below the reference voltage, the sensing rectifier 19 is forward biased and the voltage on capacitor 25 follows the voltage at the tap down to its new level, the voltage across capacitor 25 differing from this level only by the voltage drop across the diode 19. When the voltage at tap 18 again increases above the reference voltage as during the period $t_3$ to $t_4$, diode 19 is again reverse biased and capacitor 25 slowly charges through the high resistance 21 thereby substantially maintaining the relatively low voltage on the gate electrode of control rectifier 26 to sustain the nonconducting condition in this device. At time $t_4$, diode 19 is again forward biased and the small charge which has accumulated on capacitor 25 quickly discharges through diode 19 and the low resistance lower portion of potentiometer 16. Capacitor 25 is thus a memory element clamped by diode 19 to assume and preserve the lowest voltage appearing at movable tap 18.

It will thus be seen that the time at which the control rectifier 26 stops conducting has been arbitrarily set by the dashed and dotted line indicating the reference voltage level. If, at any time, combined instantaneous voltage magnitude of the three phases are below this reference voltage level, then the control rectifier 26 stops conducting and an undervoltage indication is provided.

Figure 3:
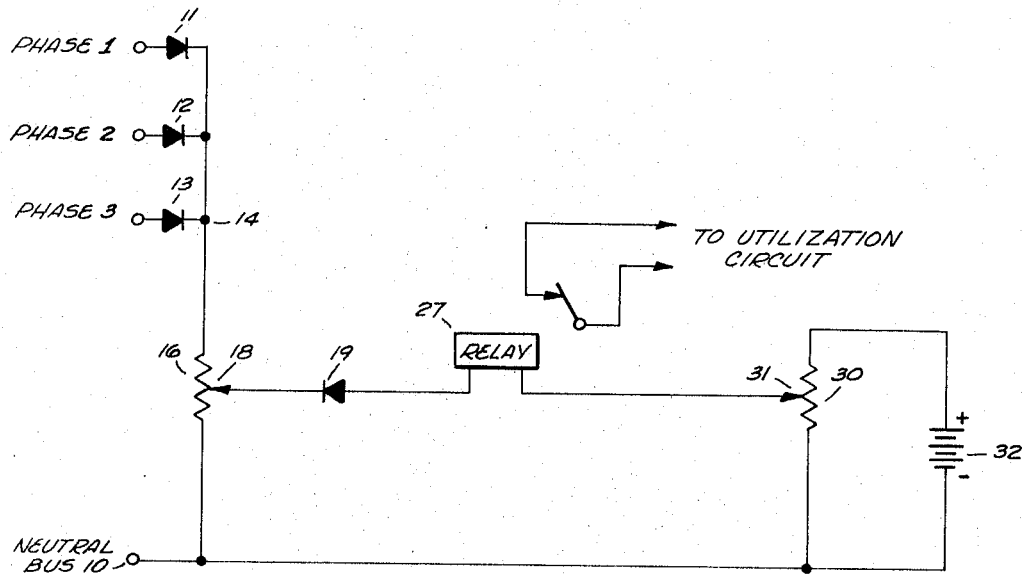
FIGURE 3 shows a schematic diagram of another embodiment of an undervoltage sensing circuit in accordance with the invention.

FIGURE 3 shows another embodiment of the invention, the elements of FIGURE 3 having the same reference numerals as their FIGURE 1 counterparts. In FIGURE 3, the current sensing circuit, the rectifier 20, the resistors 21, 22, and the capacitors 24, 25 have been omitted and replaced by a current sensing element such as the winding of the relay 27 connected directly between the movable tap 31 of the reference potentiometer 30 and the anode of the sensing rectifier 19. Such a modification would provide a condition where normally no current flows through the relay winding if the voltage magnitudes of the three phases have the proper magnitudes. However, if any voltage magnitude of the three phases dropped below a predetermined level, current might then flow from the positive terminal of the source 32 through the upper portion of the reference potentiometer 30, through the movable tap 31 and the winding of the relay 27, through the sensing rectifier 19, and through the movable tap 18 and lower portion of the sensing potentiometer 16 to the neutral bus 10. In another modification, the current sensing circuit shown in FIGURE 1 might be retained, and the rectifier and filter arrangement including the capacitors 24, 25 might be omitted. In still another modification, the potentiometer 16 may be omitted, and the cathode of the sensing rectifier 19 connected directly to the common connection 14. This would require appropriate adjustment of the magnitude of the reference voltage. While an example of a current sensing circuit is shown in FIGURE 1, it is to be understood that this is merely one of a number of circuits capable of providing an indication of current flow or of a voltage differential that initiates current flow. The current sensing circuit that is described utilizes a controlled rectifier 26 with a direct voltage supply 28 and has the operating characteristics of a gate turn-off control rectifier, commonly called the GTO. The GTO is turned on when control current is supplied to the gate electrode and is turned off in the absence of control current. Such operating characteristics have been described. The controlled rectifier 26 could as readily be a silicon controlled rectifier (SCR) and could operate as a sensor with the direct voltage supply shown if the gate and cathode leads were reversed or could operate as connected with an alternating voltage supply. Such an AC supply could be the secondary of a transformer in the place of battery 28 with a primary winding connected from one of the input voltage phases to neutral. Also, instead of the controlled rectifier 26, a transistor could be readily used as the current sensing element.

Finally, it should be mentioned that the invention can be utilized with other multiphase systems besides the three-phase system shown in FIGURE 1. Therefore, while the invention has been described with reference to a particular embodiment, it is to be understood that modifications may be made without departing from the spirit of the invention or from the scope of the claims.

What I claim as new and desire to secure by Letters Patent of the United States is:

1. An undervoltage detector for a multiphase voltage source comprising a plurality of rectifiers equal in number to the number of phases of said voltage source, means for coupling each rectifier to the corresponding one of the phase outputs of said source, means coupling each of said rectifiers together in a common output connection for deriving the unfiltered composite instantaneous voltage from the rectified voltages of said voltage source, a source of reference voltage, voltage dividing means coupled to said common output connection to derive a voltage proportional to said unfiltered composite instantaneous voltage and having a normal minimum value that is substantially equal to said reference voltage, a sensing rectifier coupling said voltage dividing means to said source of reference voltage and oriented to block current flow therethrough so long as the instantaneous voltage from said voltage dividing means exceeds said reference voltage and to permit current flow therethrough whenever the instantaneous voltage from said voltage dividing means falls below said reference voltage, and current sensing means coupled to said sensing rectifier to provide an indication whenever current flows through said sensing rectifier.

2. An undervoltage detector as recited in claim 1 further including memory means coupled across said voltage dividing means by said sensing rectifier, said memory means assuming the lowest instantaneous voltage level of said voltage dividing means and substantially preserving this voltage level so that the indication of said current sensing means is maintained.

3. An undervoltage detector as recited in claim 2 wherein said memory means includes a capacitor having a charge level which is clamped at the lowest instantaneous voltage of said voltage dividing means by said sensing rectifier, said capacitor being charged through a resistance that is high compared with the resistance of said voltage dividing means.

References Cited by the Examiner

UNITED STATES PATENTS

| | | | |
|---|---|---|---|
| 2,504,827 | 4/1950 | Goldsborough | 317—32 X |
| 3,001,100 | 9/1961 | Schuh et al. | 317—33 X |
| 3,243,796 | 3/1966 | Harmon et al. | 317—33 X |

MILTON O. HIRSHFIELD, *Primary Examiner.*

R. V. LUPO, *Assistant Examiner.*